April 21, 1964     Z. V. CARTER     3,129,974
CAR WINDOW CUSHION
Filed Feb. 14, 1963
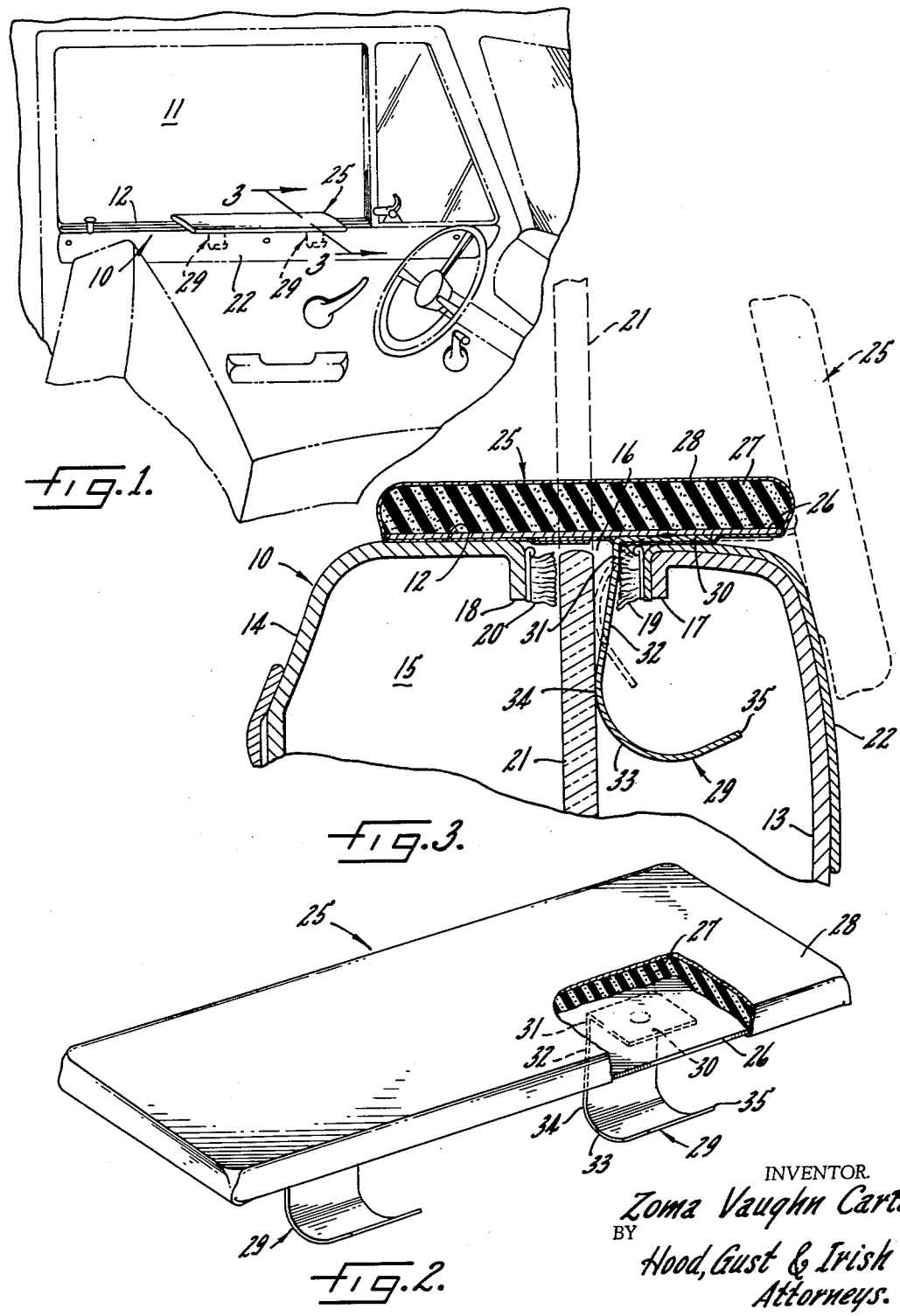
INVENTOR.
Zoma Vaughn Carter,
BY
Hood, Gust & Irish
Attorneys.

United States Patent Office 3,129,974
Patented Apr. 21, 1964

3,129,974
CAR WINDOW CUSHION
Zoma Vaughn Carter, 2505 W. Main St., Muncie, Ind.
Filed Feb. 14, 1963, Ser. No. 258,963
1 Claim. (Cl. 296—49.2)

The present invention relates to an arm rest or cushion for use on the sill of the window in an automobile door, and the primary object of the invention is to provide such a device which shall be simple and inexpensive in construction, easy to install and remove, semi-automatic in operation and quiet in use.

A further object of the invention is to provide a device of the character described which is self-retaining when mounted in the intended manner in association with an automobile window, which will not rattle whether in or out of use position and which will not be likely to mar the finish of the automobile and which will yet be readily shiftable into and out of use position.

A still further object of the invention is to provide a device of the class described which will be firmly held against accidental dislodgment from its intended mounting upon an automobile, but which may be readily manipulated to install and remove it.

Still further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claim is not violated.

FIG. 1 is a fragmentary perspective view of the driver's compartment of a conventional automobile and the windowed door adjacent thereto, showing a preferred embodiment of the present invention in use position upon the window sill;

FIG. 2 is an enlarged perspective view of my arm rest, parts being broken away for clarity of illustration; and FIG. 3 is a further enlarged, fragmentary section taken substantially on the line 3—3 of FIG. 1.

Referring more particularly to the drawings, I have shown a fragment of a conventional automobile door indicated generally by the reference numeral 10. Such a door is customarily provided with a window opening 11 partially defined by a substantially horizontal sill 12, and comprises spaced inner and outer walls 13 and 14 defining a socket 15 having an open mouth 16 defined by inner and outer down-turned lips 17 and 18 and interrupting the surface of the sill 12. Customarily, wipers 19 and 20 are supported from the lips 17 and 18, substantially engaging the inner and outer surfaces of a window pane 21 which is receivable in the socket 15 and which is elevatable, through the socket mouth 16, to close the window opening 11. Customarily, a trim 22 overlies the upper portion of the inner door wall 13, as illustrated.

Many drivers like to rest their elbows on the sill 12 whenever the pane 21 is fully retracted; but on hot summer days, when the sill 12 is exposed to the sun, it becomes heated to such a degree that it is quite uncomfortable to a bare arm. Further, in some vehicles, the sill 12 is not completely smooth, and in some vehicles the pane 21 is not fully retractable. Still other reasons may exist to interfere with the comfort of an arm resting on an unprotected sill; and therefore numerous attempts have been made to provide a more comfortable arm rest to be associated with the sill of an automobile window. So far as I am advised, however, all such devices hitherto conceived have been subject to objectionable characteristics of one kind or another. According to the present invention, all of the disadvantages of previously known devices of the general character here under consideration are overcome.

My arm rest, indicated generally by the reference numeral 25 in the accompanying drawings, comprises a plate 26 of any suitable material, such as sheet metal, plastic or even wood. In the preferred form of the invention, the plate 26 may preferably be about 12" long, 3½" to 4" wide and of suitable thickness to provide desirable rigidity. Any desired form of padding such, for instance, as foam rubber, is mounted on the upper surface of the plate 26, as indicated at 27, and a suitable cover 28, which may be cloth, sheet plastic or any other readily flexible, protective material, is wrapped about the plate and padding completely to cover that assembly.

Hook means, indicated generally by the reference numeral 29, depends from the lower surface of the plate 26. Desirably, two hooks 29 will be provided at longitudinally spaced points.

Each hook comprises a base 30 which is suitably secured to the bottom surface of the plate 26 as, for instance, by spot welding, riveting or any other suitable fastening means. Each hook is formed of resilient material such as spring steel, and each includes, in the preferred form of the invention, a vertically-short, downwardly extending portion 31; and preferably each hook base will be so located that its portion 31 is slightly spaced toward one longitudinal edge of the plate 26 from the longitudinal median line of said plate. Merging with the distal end of the portion 31, each hook is formed to provide a portion 32 which inclines downwardly and away from said one edge toward the vertical plane which includes said median line. Each hook is further formed to provide a portion 33, merging at 34 with the lower end of the inclined portion, and curving downwardly and away from said vertical plane beyond the plane of the portion 31. A toe portion 35 merges with said curved portion and inclines upwardly toward the plate 26. The two hooks 29 are preferably quite accurately aligned in a longitudinal direction.

With the arm rest tilted in a clockwise direction beyond the dotted line position of FIG. 3, the toes 35 of the hooks 29 may be concurrently inserted between the pane 21 and the wiper 19. It will be found most convenient to elevate the pane 21 at least slightly before this installing operation is begun. The toe portions of the hooks may now be forced downwardly, somewhat compressing the wiper 19; and, as the curved hook portions 33 begin to enter the socket mouth 16, the whole assembly will be somewhat rotated in a counter-clockwise direction, until the assembly attains the dotted line position of FIG. 3. In this position, the portion of the cover 28 which overlies the hook bases 30 will bear firmly against the trim 22, while the curved portion 33 of the hooks will be frictionally gripped between the pane 21 and the wiper 19, whereby the assembly will be firmly held in that position.

Now, if the pane 21 is fully retracted so that its upper edge is below the level of the sill 12, the arm rest 25 may be rotated in a counter-clockwise direction into its solid line position in which the padded plate 26 rests solidly upon the sill 12, spanning the socket mouth 16, while the hooks are disposed wholly within the socket 15. The parts are so proportioned and arranged that, in this position of the assembly, the region 34 of the hooks bears against the pane 21 to flex the inclined portion 32 inwardly, thus exerting a resilient force tending to retain the arm rest in its solid line position. In this posture, the toes 35 underlie the lip 17, affirmatively to prevent removal of the arm rest by vertical movement.

If, now, the pane 21 is elevated, its upper edge will engage the plate 26 in an area spaced to the left of the vertical plane including the hook portion 31, to swing or rotate the assembly 25 substantially about the upper edge of the wiper 19, the hook portions 31 and 32 riding past said wiper edge, whereby the arm rest 25 will be moved toward its dotted line position. It is found that, in some installations, this movement will be continued only until the outer edge of the arm rest clears the path of the pane 21, and the arm rest must be manually turned to the dotted line position. In other installations, however, it is found that the arm rest is overbalanced as its outer edge so clears the path of the pane, and will fall by gravity into its dotted line position; while in still other installations, the frictional engagement of the curved hook portions 33 with the pane 21 is sufficient to continue the rocking movement of the arm rest, as the pane rises, into the dotted line position illustrated in FIG. 3. In the last-mentioned type of installations, that frictional engagement is at least sometimes sufficient automatically to move the arm rest from its dotted line position to its solid line position as the pane 21 is retracted; but in most instances the arm rest must be manually moved from its dotted line position to its solid line position.

I claim as my invention:

For use with an automobile door having a window opening defined partially by a sill interrupted by a pane socket formed to provide a mouth opening through said sill and defined between an inner lip and an outer lip spaced respectively from the inner and outer walls of said door, and a window pane receivable in said socket and elevatable through said socket mouth to close said window opening; the invention which comprises an elongated, padded plate provided with a resilient hook depending from the bottom of said plate at a point near the median longitudinal line of said plate, said hook including an outwardly and downwardly inclined portion merging with an inwardly curved portion terminating in a toe rising toward said plate, said hook being so proportioned and arranged that, when said plate is disposed flatly on such a sill to span the socket mouth thereof with said hook entered in the socket between the pane and the inner lip of such socket, said hook, adjacent the point of mergence between said inclined portion and said curved portion, will engage such pane to flex said inclined portion inwardly and said toe will underlie said inner lip; and when said pane is elevated it will engage and rock said plate inwardly relative to said sill to a position in which an intermediate part of said hook curved portion will engage said pane, with said toe disposed within said socket and extending away from said pane toward the inner wall of said door.

References Cited in the file of this patent

UNITED STATES PATENTS

| | | |
|---|---|---|
| 1,962,508 | Josselyn | June 12, 1934 |
| 2,050,951 | Hundertmark | Aug. 11, 1936 |
| 2,577,561 | Atwater | Dec. 4, 1951 |
| 2,711,344 | Lansen | June 21, 1955 |